United States Patent [19]

Barrett

[11] 4,178,008
[45] Dec. 11, 1979

[54] SIDE BY SIDE BICYCLE

[76] Inventor: Robert C. Barrett, 1511 Walnut St., Berkeley, Calif. 94709

[21] Appl. No.: 835,305

[22] Filed: Sep. 21, 1977

[51] Int. Cl.² .............................................. B62M 1/00
[52] U.S. Cl. .................................... 280/231; 280/209
[58] Field of Search ............... 280/231, 209, 273, 278, 280/287

[56] References Cited

U.S. PATENT DOCUMENTS

| Re. 11,561 | 8/1896 | Weaver | 280/231 |
|---|---|---|---|
| 563,958 | 7/1896 | Grilli | 280/231 |
| 583,553 | 6/1897 | Sholl | 280/231 |
| 590,687 | 9/1897 | Peugnet | 280/273 |
| 615,231 | 11/1898 | Williams | 280/231 |

FOREIGN PATENT DOCUMENTS

| 869980 | 2/1942 | France | 280/231 |
|---|---|---|---|
| 870722 | 3/1942 | France | 280/231 |
| 431211 | 2/1948 | Italy | 280/230 |
| 9315 | of 1898 | United Kingdom | 280/231 |
| 25398 | of 1899 | United Kingdom | 280/231 |

Primary Examiner—Trygve M. Blix
Assistant Examiner—Terrance L. Siemens
Attorney, Agent, or Firm—Lothrop & West

[57] ABSTRACT

A side by side bicycle has a frame including rear forks, a transverse crank tube, an upright seat tube and an upright steering tube. A rear wheel is mounted in the rear forks, and a crankshaft is journalled in the crank tube. There is a first pair of cranked pedals on one end of the crankshaft on one side of the frame and a second pair of cranked pedals on the other end of the crankshaft on the other side of the frame. A chain and sprocket mechanism connects the crankshaft to the rear wheel. A steering spindle is journalled in the steering tube, and front forks are secured to the steering spindle and carry a front wheel. From the steering tube a duplex yoke has yoke bars that extend laterally at a variable orientation. At one end of one yoke bar there is a handle bar tube from which a handle bar post projects upwardly to carry a first set of handle bars. The other yoke bar at its opposite end carries a steering head with a steering sleeve rotatably mounted in it. A steering post extends upwardly and is axially and rotatably movable in the steering sleeve, being clamped in a selected position. A second set of handle bars is on the steering post, at the bottom of which there is a chain interconnecting the steering sleeve and the steering spindle, the chain runs passing on opposite sides of the adjacent yoke bar.

6 Claims, 9 Drawing Figures

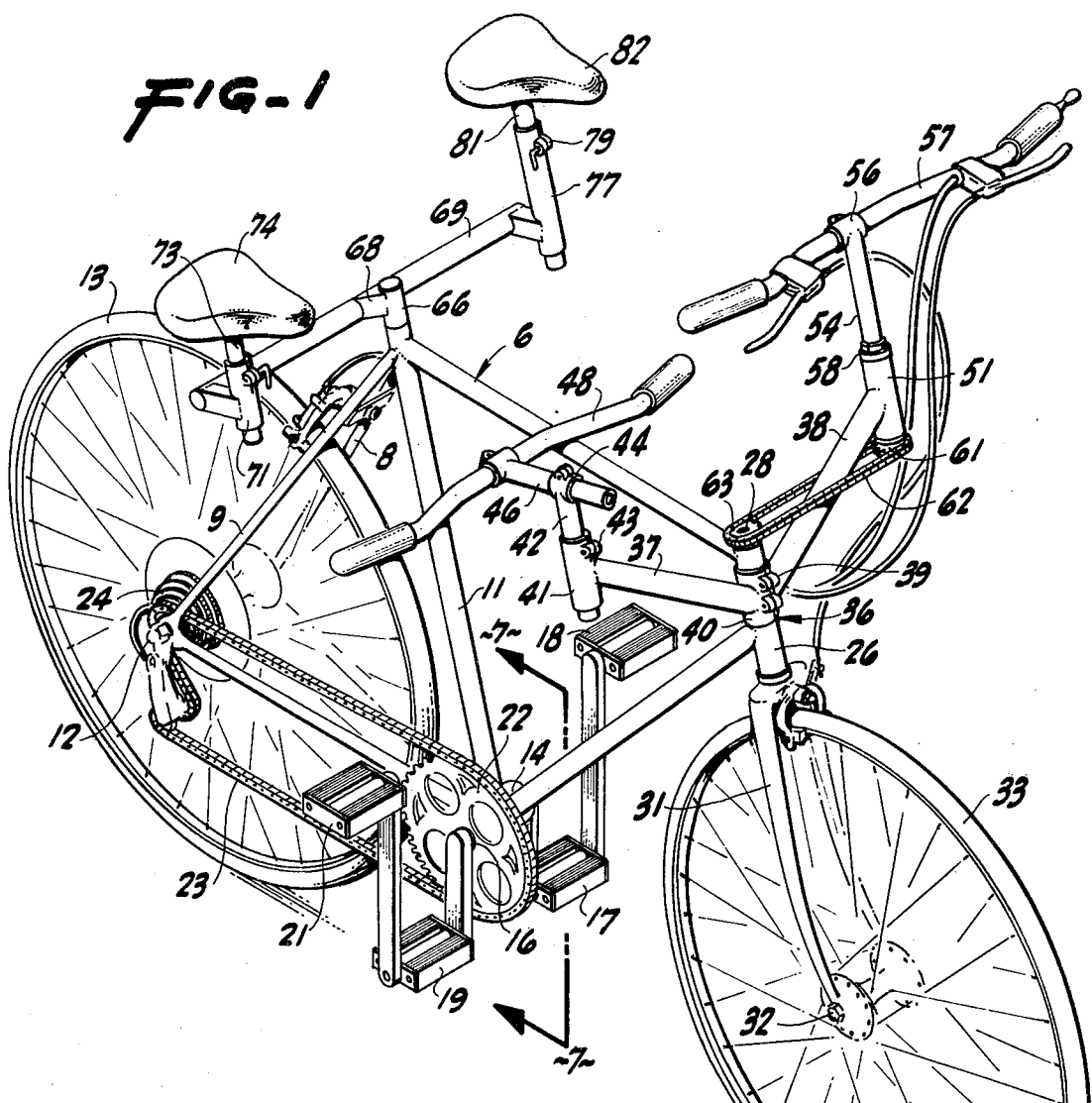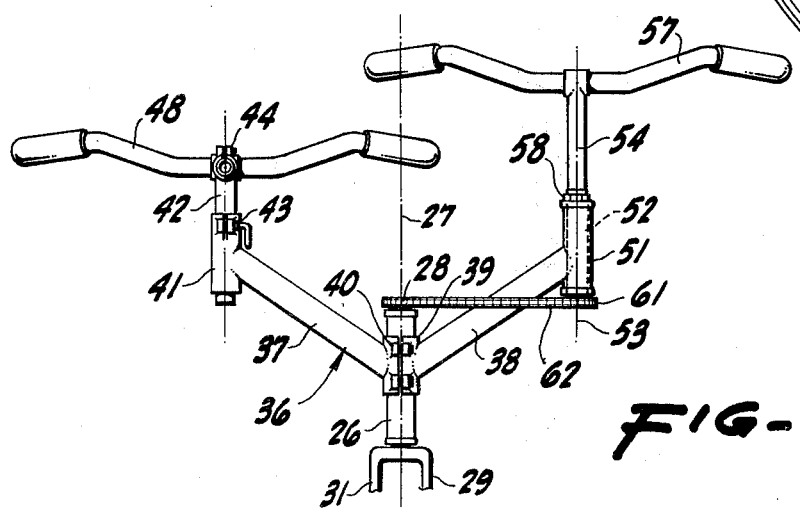

SIDE BY SIDE BICYCLE

BRIEF SUMMARY OF THE INVENTION

In order for a bicycle to carry more than one person at a time, it has been customary in some instances to arrange the riders in tandem and in other instances to arrange the riders side by side. This latter arrangement is in many respects preferred but has some difficulty in that the riders tend to have their centers of mass a substantial distance away from the median, vertical, longitudinal plane of the bicycle and also tend to interfere with each other in the operation of the vehicle. To keep the centers of gravity close to the center of the machine and to arrange for little or no interference between the riders, it is presently arranged so that the riders' seats can be longitudinally staggered and maintained at different heights; and it is also arranged so that the handle bars can be set at different locations in a fore and aft direction and likewise at different heights. The riders, although seated generally side by side, can be in effect vertically and longitudinally somewhat spaced apart so as partially at least to interfit transversely. This is particularly advantageous if the riders are disparate in size, skill or physical ability; e.g. should one of the riders be handicapped. The steering is preferably arranged to be done by one rider only with the other rider being given handle bars of a nonrotatable nature. The pedaling is provided for by two pairs of cranked pedals arranged respectively on opposite sides of the central, longitudinal plane of the vehicle. With this construction the riding is compact, well balanced, without interference and easy.

BRIEF DESCRIPTION OF THE SEVERAL VIEWS OF THE DRAWING

FIG. 1 is an isometric view of a side by side vehicle constructed pursuant to the invention, many of the normally used auxiliary devices being omitted for clarity.

FIG. 2 is a partial front elevation of the structure illustrating the normal relationship of the handle bars from the approaching aspect.

DETAILED DESCRIPTION

Figure 3:
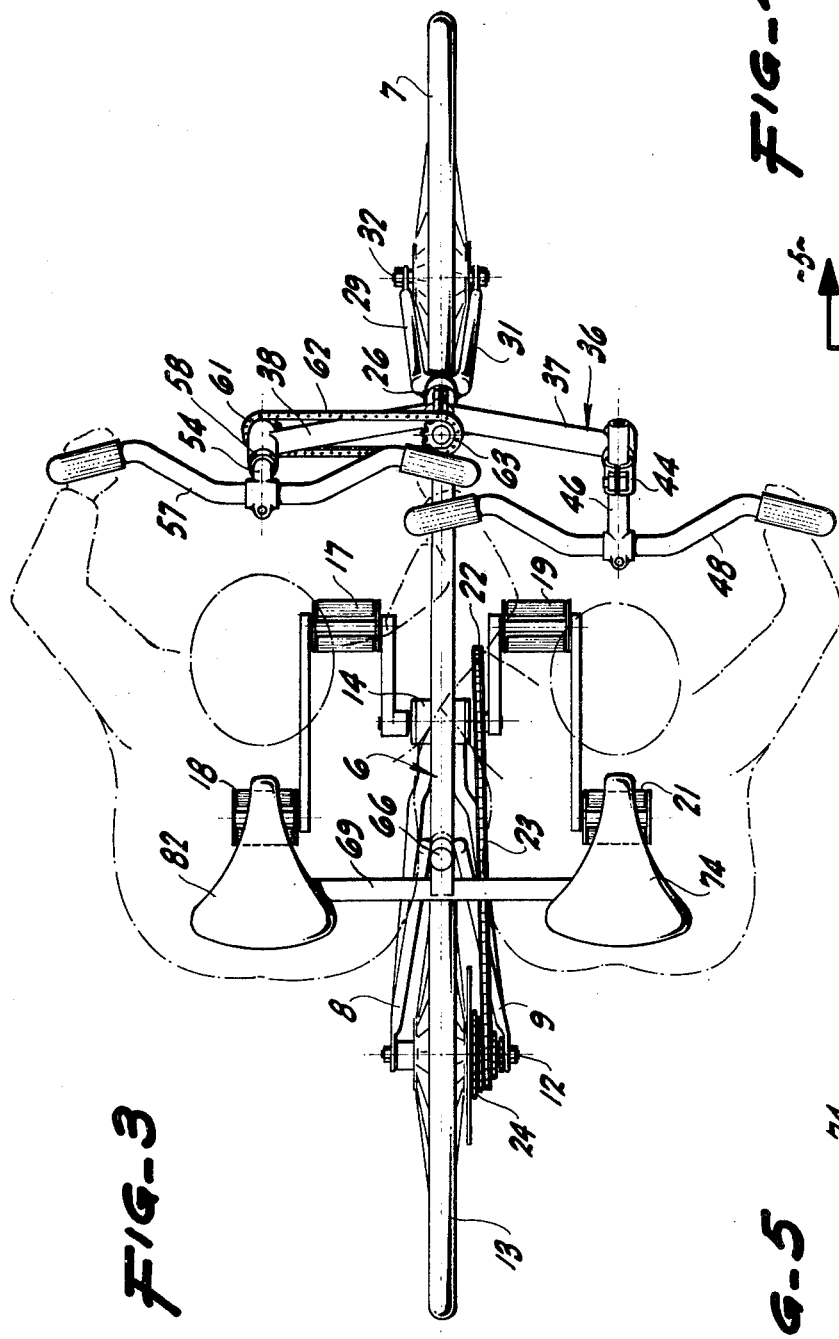
FIG. 3 is a plan of the bicycle showing one arrangement or spacing of the parts for close interfitting of the riders without interference.
Figure 4:
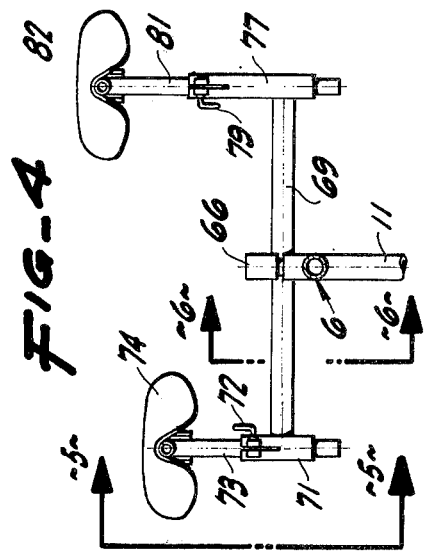
FIG. 4 is a detailed elevation from the approaching aspect, the view being taken in cross-section on a vertical transverse plane as indicated by the line 4—4 of FIG. 1.
Figure 5:
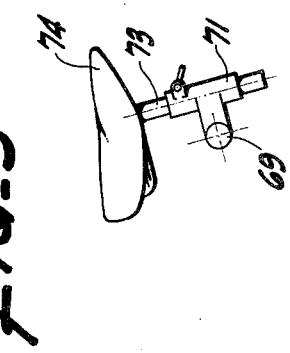
FIG. 5 is a detail showing one aspect of a saddle in side elevation, the plane of section being indicated by the line 5—5 of FIG. 4.

The present bicycle can be embodied in a large number of different ways and has successfully been incorporated in the form illustrated herein. In this arrangement there is provided a main frame 6 made up, as is customary, from a number of light metal tubes connected together to form a rigidly braced central structure normally extending in a vertical longitudinal plane and symmetrical about a center line 7.

The frame includes a pair of rear forks 8 and 9 extending downwardly and rearwardly from an upright seat tube 11 and arranged to mount the axle 12 of a rear ground-engaging wheel 13 of the customary kind.

Near the bottom of the seat tube 11 there is a transversely extending crank housing 14. The housing 14 contains bearings in the usual fashion which rotatably support a transversely extending crankshaft 16. To one end of the crankshaft there is attached a pair of cranked pedals 17 and 18 arranged at equal radii from the rotational axis of the crankshaft 16 and staggered with respect to each other. Similarly, at the other end of the crankshaft there is another pair or set of cranked pedals 19 and 21 similarly arranged and coplanar with the pedals 17 and 18.

Associated with the crankshaft 16 and fast thereon is a driving sprocket 22 engaged by a chain 23 extending to a sprocket 24 united with the rear wheel 13. While it is customary to employ some relatively elaborate speed or ratio-changing mechanisms between the crankshaft and the rear wheel, they are omitted herefrom for simplicity.

Also included in the main frame 6 at the forward end thereof is a steering tube 26 that is aligned with a substantially upright or slightly inclined axis 27, a steering axis. Mounted in bearings within the steering tube is a steering spindle 28 rotatable about the axis 27 and below the bottom of the steering tube branching into front forks 29 and 31. Between them the forks carry an axle 32 on which a front wheel 33 is rotatable.

Adjustably engaging the steering tube 26 externally is a yoke 36 preferably made up of two yoke bars 37 and 38. These are releasably held together by fastenings and half clamps 39 and 40. In this way the yoke 36 can be positioned with some small leeway in a vertical direction on the steering tube 26 and can be rotated around the axis 27 and then clamped on the tube 26 in a selected position. The yoke bar 37 extends laterally and upwardly from the half clamp 39 and terminates in a handle bar tube 41 in which is rotatably and axially disposed a handle bar post 42. The post 42 can be lifted and lowered or rotated at will and then be set and held in position by a clamp 43. The upper end of the handle bar post terminates in a clamp socket 44 extending generally fore and aft and effective to clamp a handle bar tube 46 which can be moved fore and aft and rotated, if desired. A clamp 47 at the end of the tube 46 engages a first set of handle bars 48. The handle bars 48 are generally locked in any selected, adjusted position for comfortable gripping and have no effect to steer the vehicle.

In contrast, the yoke bar 38 extends laterally and upwardly from the half clamp 40 symmetrically with the member 37 but ends in a cylindrical steering head 51. Within the head 51 is a steering sleeve 52 mounted to rotate about an upright axis 53 generally parallel with the axis 27. Within the steering sleeve 52 is disposed a steering post 54 at the upper end carrying a clamp 56 within which a second set of handle bars 57 is disposed. The post 54 can be raised and lowered, as elected, and can be rotated with respect to the steering sleeve 52 and then held in selected position by a clamp 58 on the steering sleeve.

The lower end of the steering sleeve projects below the steering head 51 and carries a sprocket 61 in engagement with a chain 62. A sprocket 63 at the upper end of the steering spindle 28 is also engaged by the chain 62. A convenient arrangement is to have one run of the chain 62 pass the yoke bar 38 on the trailing side thereof and the other run of the chain pass the yoke bar 38 on the leading side thereof. With this arrangement a rider, utilizing the second set of handle bars 57, can easily rotate the steering sleeve in the steering head and through the chain 62 produce a corresponding rotation of the steering spindle and the front forks so that the steering of the vehicle is accomplished by one of the riders only. With this arrangement, whenever the yoke 36 is rotated about the axis 27, the chain interconnection causes the handle bar 57 to remain parallel to itself so that steering is always the same despite angular adjustment.

Figure 6:
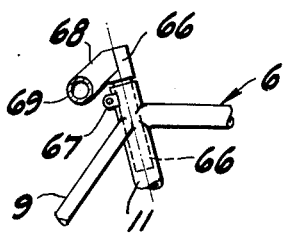
FIG. 6 is a detail in cross-section, the plane of which is indicated by the line 6—6 of FIG. 4.
Figure 7:
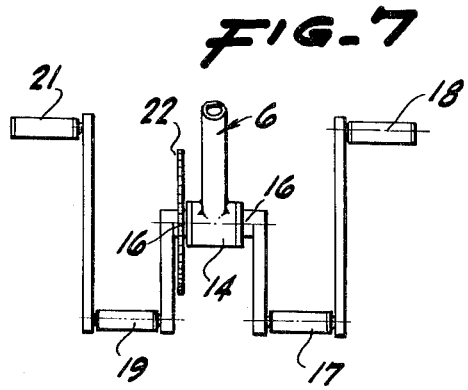
FIG. 7 is a view in transverse, vertical cross-section, the plane of which is indicated by the line 7—7 of FIG. 1, and illustrating the crank and pedal arrangement.

Projecting upwardly from the seat tube 11 is a seat post 66 that can be raised and lowered and rotated and then held in set position by a clamp 67 (FIG. 6). The seat post has a rearwardly extending bracket 68 merging with a transverse bar 69. At one end the bar 69 carries a forwardly displaced clamp head 71 with a clamp fixture 72 thereon to receive the post 73 of a first saddle 74. The saddle can be raised and lowered and also rotated and finally clamped. On the other side, the transverse bar 69 ends in a somewhat longer, forwardly displaced clamp tube 77 having a clamp 79 incorporated therewith and in engagement with a saddle post 81 supporting a second saddle 82.

With this arrangement the machine can be prepared for any service and for any pair of riders by first loosening the various clamps, axially moving and rotating the associated parts and then tightening the clamps to arrange the machine for use by the two momentarily-intended riders. A convenient arrangement, often most satisfactory, is as shown in the plan view of FIG. 3. The relatively smaller rider is given the first saddle 74 and the larger rider the second saddle 82. To preclude interference between the riders and to seat them so that their adjacent shoulders and arms are staggered not only in a fore and aft direction but also in a vertical direction, the half clamps 39 and 40 of the yoke 36 are loosened. The first and second sets of handle bars are moved forwardly and rearwardly respectively from a central position in order to place the smaller rider somewhat to the rear, for example. The half clamps are then tightened. Also the clamps 43 and 58 are loosened, the handle bar post 42 is lowered and the post 54 is raised and the clamps are tightened.

Similarly, the clamp 67 (FIG. 6) is loosened and the transverse bar 69 and the seat post 66 are rotated so that the first saddle 74 is to the rear of the second saddle 82 by a substantial distance. The clamping bolt 67 is then tightened. Finally, the seats 74 and 82 are lowered and raised respectively and also rotated to compensate for the rotation of the transverse bar. The seat positions may also compensate for the lateral or rotary inclination of the steering yoke, being either at the same angle or at a greater or lesser angle in order to fit the preferences of the two riders.

When all of the adjustable members have been set and locked, the bicycle can readily be ridden with the two riders being close to the central plane so as to keep the center of gravity accurately in the center portion of the machine. Both riders also have a fair position with regard to the sets of pedals. The rider in the saddle 74 simply grasps the handle bars as a steady rest without any steering effort using them to help counteract the pedal force. The principal rider in the second saddle 82, for example, takes over the steering duties utilizing his handle bars in a proper position to clear the hands and handle bars of the passenger or guest rider. The steering handle bars 57 in any adjusted position of the yoke 36 remain parallel to themselves so the steering rider does not have to compensate for even substantial fore and aft differences in the positions of the posts 42 and 54. The adjustments tend to move the riders toward the center plane of the machine for better balance and also can be used to interfit or stagger the adjacent shoulders and arms for non-interference despite close transverse coupling. Vertical variation of the adjustments also tends to interfit or stagger the arms and shoulders to reduce interference while maintaining close transverse coupling. In this way the machine can be well used by riders of varying physiques and effectiveness, with a safe ride and with comfort and pleasure.

Figure 8:
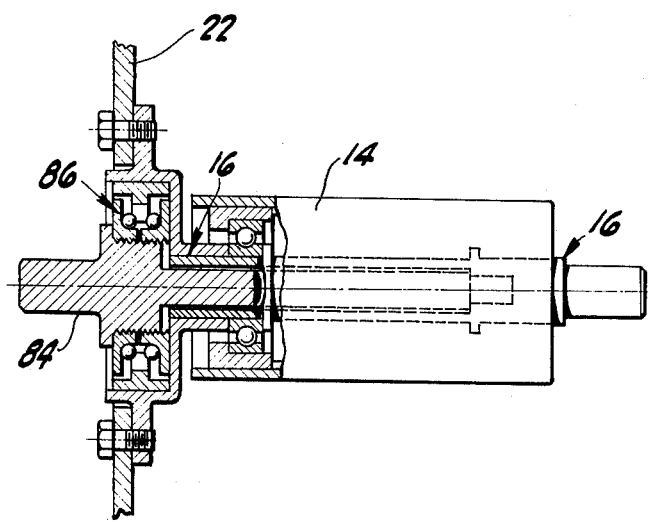
FIG. 8 is a cross-section of an alternative pedal arrangement.

For most pairs of riders the usual arrangement is that both riders pedal synchronously and more or less equally. There are instances in which the riders' capabilities are not equal or one rider should be favored perhaps due to courtesy or choice or perhaps due to disability or the like. To allow versatility in that factor, the pedal construction is made as shown in FIG. 8. The main pedal or crankshaft 16 journalled in the tubular housing 14 forming part of the frame has the usual direct connection to the pedals on one side; say, the left side, and to the sprocket. But on the other, right side the shaft 16 is not directly connected to the right pedals but is joined to their individual shaft 84 through an overrunning or one way clutch 86 engaging in the forward direction of rotation. With this arrangement, the right-hand rider can contribute to the propulsion or can refrain from doing so. This construction also gives an opportunity, if the left-hand rider is riding alone, to tie or catch the right-hand pedals in a horizontal position and so more easily avoid ground interference during sharply leaning right turns.

Figure 9:
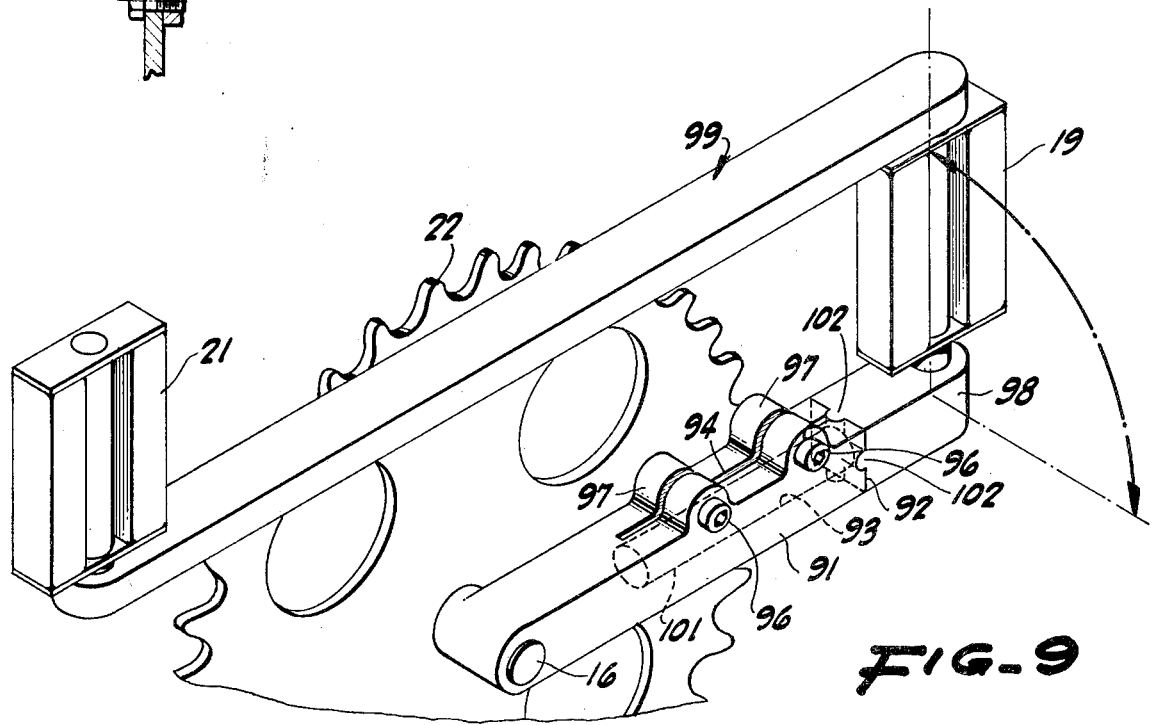
FIG. 9 is an isometric perspective, portions being broken away, of a folding pedal arrangement.

In some cases there is a distinct advantage in compacting or reducing the overall transverse width of the side by side bicycle especially for ready transport aboard other vehicles or for storage or shipping or like purposes. When transverse compactness is important there is used a construction, as shown in FIG. 9, in which the pedal projection is substantially minimized. The sprocket 22 is as before but both cranks 91, fixed to the crankshaft 16, are especially formed. Each has a transverse end 92 from which a bore 93 extends into the crank. The crank is also formed with a slot 94 open to the bore. One or more bolts 96 pass through one or more bosses 97 on the crank. A separate crank end 98 carries the remaining pedal and crank structure 99 and has a rod 101 received in the bore 93. When the bolts 96 are loose, the end 98 and the attached pedal structure 99 can be revolved between a working position with the pedal structure projecting or a compact position with the pedal structure disposed close to the plane of the sprocket 22. The bolts 96 are easily tightened in either position to hold the pedal structure in the desired location. A detent tooth 102 can can fit a similarly contoured slot end or a notch in the crank 91 to assist in holding the crank structure in either extreme position.

The pedal structures on both sides can be rotated into their compact position. The yoke 36 can be loosened and the yoke bars brought as nearly as possible into the plane of the main frame 6. The second set of handle bars 57 does not automatically rotate into the planar, folded position due to the chain connection 62. However, the clamp 58 can also be loosened and the steering post 54 and the handle bars 57 can be turned as a unit to lie approximately in the plane of the main frame 6. The first set of handle bars 48 rotates with the yoke bars 37 and 38 to a longitudinally extending attitude. Also, the clamp 67 (FIG. 6) can be loosened and the seat post 66 can be rotated to bring the saddles 74 and 82 as close as possible to the central plane. The saddles themselves can also be rotated but this is usually not necessary unless their longitudinal and transverse dimensions vary greatly. All of these rotations result in a substantial reduction in the overall transverse dimension of the bicycle thus facilitating storage and transportation.

I claim:

1. A side by side bicycle comprising:
    a frame having a rear fork thereon and a rear wheel rotatably supported by said rear fork;
    a front fork journalled on said frame on a generally upright axis and rotatably supporting a front wheel;
    a yoke on said frame adjacent said front fork and having first and second yoke bars of predetermined length laterally extending from opposite sides thereof;
    a first set of laterally extending handle bars rotatably mounted on the outer end of said first yoke bar and being drivingly connected to said front fork, each handle bar of said first set extending more than said predetermined length from said outer end of said first yoke bar;
    a second set of laterally extending handle bars fixedly but adjustably mounted on the outer end of said second yoke bar, each handle bar of said second set extending more than said predetermined length from said outer end of said second yoke bar;
    a pair of laterally spaced seats adjustably mounted on said frame on opposite sides thereof;
    drive means for said rear wheel and including a pair of cranked pedals on each side of said frame; and
    means for offsetting said first set and said second set of handle bars relative to each other in at least one of the vertical and fore and aft directions whereby said handle bars of said sets are in non-interfering paths and the arms of a pair of riders will overlap without interference and thereby permit positioning said riders in close proximity to said frame.

2. A bicycle as defined in claim 1 wherein said second set of handle bars is mounted on said yoke for fore and aft, vertical and rotary movement relative to said second yoke bar.

3. A bicycle as defined in claim 1 wherein said yoke is selectively adjustable about said generally upright axis to lie generally in a plane defined by said frame.

4. A bicycle as defined in claim 3 wherein said first handlebars are selectively adjustable about a second generally upright axis on said yoke and relative to said front fork.

5. A bicycle as defined in claim 1 wherein said seats are mounted at the ends of a transverse member mounted on said frame for rotary adjustment about a third generally upright axis.

6. A bicycle as defined in claim 1 wherein each pair of said cranked pedals includes an inner crank arm adjacent said frame, each of said inner crank arms comprising means for selectively rotating its pair of pedals about the axis of said crank arms to thereby swing said pedals into close proximity to said frame.

* * * * *